United States Patent
Carrion

(10) Patent No.: US 9,782,702 B2
(45) Date of Patent: Oct. 10, 2017

(54) FILTER ASSEMBLIES, FILTER ELEMENTS, AND METHODS FOR FILTERING LIQUIDS

(71) Applicant: Pall Corporation, Port Washington, NY (US)

(72) Inventor: Alexander Carrion, Tampa, FL (US)

(73) Assignee: Pall Corporation, Port Washington, NY (US)

( * ) Notice: Subject to any disclaimer, the term of this patent is extended or adjusted under 35 U.S.C. 154(b) by 137 days.

(21) Appl. No.: 14/284,777

(22) Filed: May 22, 2014

(65) Prior Publication Data

US 2015/0336034 A1    Nov. 26, 2015

(51) Int. Cl.
| | |
|---|---|
| *C02F 1/40* | (2006.01) |
| *B01D 61/00* | (2006.01) |
| *B01D 35/18* | (2006.01) |
| *C02F 1/00* | (2006.01) |
| *B01D 24/00* | (2006.01) |
| *B01D 27/00* | (2006.01) |
| *C02F 1/02* | (2006.01) |
| *B01D 29/56* | (2006.01) |
| *B01D 29/21* | (2006.01) |
| *B01D 29/23* | (2006.01) |
| *B01D 29/54* | (2006.01) |

(52) U.S. Cl.
CPC ............ *B01D 29/56* (2013.01); *B01D 29/21* (2013.01); *B01D 29/232* (2013.01); *B01D 29/54* (2013.01); *B01D 35/18* (2013.01); *B01D 2201/0415* (2013.01); *B01D 2201/298* (2013.01); *B01D 2201/46* (2013.01)

(58) Field of Classification Search
USPC ....... 210/493.3, 487, 323.2, 493.2, 175, 767
See application file for complete search history.

(56) References Cited

U.S. PATENT DOCUMENTS

| | | | | |
|---|---|---|---|---|
| 3,211,292 | A | | 10/1965 | Bull |
| 3,283,902 | A | * | 11/1966 | Silverwater ............ B01D 29/21 |
| | | | | 116/DIG. 42 |
| 3,988,244 | A | * | 10/1976 | Brooks ................ B01D 27/144 |
| | | | | 210/317 |

(Continued)

FOREIGN PATENT DOCUMENTS

| | | | | |
|---|---|---|---|---|
| CA | WO 0071228 | A1 * | 11/2000 | ............ B01D 29/15 |
| DE | 27 22 456 | A1 | 11/1978 | |

(Continued)

OTHER PUBLICATIONS

European Patent Office, European Search Report in Patent Application No. EP 15 15 6473, dated Oct. 23, 2015.

*Primary Examiner* — Ana Fortuna
(74) *Attorney, Agent, or Firm* — Leydig Voit & Mayer

(57) ABSTRACT

A filter assembly includes a housing and a first filter, a second filter, and a heat exchanger all positioned in the housing. The filter assembly also includes a first inlet and a first outlet and defines a first liquid flow path. The first liquid flow path may extend within the housing between the first inlet and the first outlet through the first filter and along a first side of the heat exchanger. The filter assembly further includes a second inlet and a second outlet and defines a second liquid flow path. The second liquid flow path may extend within the housing between the second inlet and the second outlet through the second filter and along a second side of the heat exchanger.

18 Claims, 6 Drawing Sheets

(56) References Cited

U.S. PATENT DOCUMENTS

| | | | | |
|---|---|---|---|---|
| 4,824,564 A * | 4/1989 | Edwards | ............... | B01D 25/24 210/232 |
| 5,232,595 A | 8/1993 | Meyer | | |
| 5,252,207 A * | 10/1993 | Miller | ............... | B01D 29/012 210/335 |
| 5,543,047 A | 8/1996 | Stoyell et al. | | |
| 5,628,909 A | 5/1997 | Bellhouse | | |
| 5,779,886 A | 7/1998 | Couture | | |
| 5,824,232 A | 10/1998 | Asher et al. | | |
| 5,922,196 A * | 7/1999 | Baumann | ............... | B01D 29/21 123/196 A |
| 6,675,881 B1 * | 1/2004 | Rago | ............... | F28D 7/106 138/38 |
| 6,902,672 B2 | 6/2005 | Herron | | |
| 7,108,139 B2 | 9/2006 | Nguyen | | |
| 7,407,058 B2 | 8/2008 | Mertens et al. | | |
| 7,854,329 B2 | 12/2010 | Malgorn et al. | | |
| 7,897,046 B2 * | 3/2011 | Fick | ............... | B01D 29/111 210/232 |
| 8,075,720 B2 | 12/2011 | Fall et al. | | |
| 8,147,693 B2 | 4/2012 | Terry et al. | | |
| 2006/0191832 A1 * | 8/2006 | Richie | ............... | B01D 29/21 210/171 |
| 2006/0219635 A1 | 10/2006 | McCague et al. | | |
| 2009/0020472 A1 * | 1/2009 | Lucas | ............... | B01D 29/21 210/458 |
| 2011/0132583 A1 | 6/2011 | Vironneau et al. | | |
| 2015/0336034 A1 * | 11/2015 | Carrion | ............... | B01D 29/56 210/774 |
| 2017/0164439 A1 * | 6/2017 | Reed | ............... | H05B 33/0827 |

FOREIGN PATENT DOCUMENTS

| | | |
|---|---|---|
| KR | 20-2012-0005093 U | 7/2012 |
| WO | WO 00/71228 A1 | 11/2000 |
| WO | WO 2005/082484 A1 | 9/2005 |

* cited by examiner

FILTER ASSEMBLIES, FILTER ELEMENTS, AND METHODS FOR FILTERING LIQUIDS

DISCLOSURE OF THE INVENTION

The present invention relates to filter assemblies, filter elements, and methods for filtering liquids. Filter assemblies embodying the invention may include a housing and a first filter, a second filter, and a thermally conductive heat exchanger all positioned in the single housing. Each filter may include a permeable filter medium for removing any of a wide variety of undesirable substances from unfiltered liquid that flows through the filter medium. The housing of the filter assembly may also define a first liquid flow path which extends within the housing from a first inlet to a first outlet. The first liquid flow path passes through the first filter and along a first side of the heat exchanger. The housing may further define a second liquid flow path which extends within the housing from a second inlet to a second outlet. The second liquid flow path also passes through the second filter and along a second side of the heat exchanger.

Filter elements embodying the invention may be removably mounted in the housing of the filter assembly and may include a filter structure having a first filter, a second filter, and a heat exchanger. Each filter may have a permeable filter medium and a hollow, generally cylindrical shape. The hollow first filter may be located within the hollow second filter, and the heat exchanger may be located in an annular space between the first and second filters. The filter structure may have first and second opposite ends, and first and second end caps may be mounted to the first and second ends of the filter structure. Between them, the first and second end caps may include the first, second, and third openings. A first liquid flow path may extend within the filter element between the first opening and the second opening and may pass through the filter medium of the first filter and along a first side of the heat exchanger. A second liquid flow path may extend within the filter element between the outer periphery of the second filter and the third opening and may pass through the filter medium of the second filter and along a second side of the heat exchanger.

Methods embodying the invention may include directing a first liquid along a first flow path within a housing and directing a second liquid along a second flow path within the housing. Directing the first liquid along a first flow path may include 1) passing the first liquid through a first permeable filter medium within the housing to remove one or more substances from the first liquid and 2) passing the first liquid along a first side of a thermally conductive heat exchanger within the housing. Directing the second liquid along a second flow path may include 1) passing the second liquid through a second permeable filter medium within the housing to remove one or more substances from the second liquid and 2) passing the second liquid along a second side of the heat exchanger. Methods embodying the invention may further include transferring heat through the heat exchanger between the first and second liquids.

Filter assemblies, filter elements, and methods embodying the invention offer many significant advantages. For example, by providing first and second filters for filtering the first and second liquids, undesirable substances are thoroughly removed from both liquids, leaving both liquids substantially free of contaminants. Further, by passing the first liquid along the first side of the heat exchanger and passing the second liquid along the second side of the heat exchanger, heat may be transferred through the thermally conductive heat exchanger between the two liquids, thereby cooling one liquid and warming the other liquid. In addition, all of these functions, i.e., the filtration of the first liquid, filtration of the second liquid, and heat exchange between the two liquids, are accomplished in a single housing. Having a single housing for the first filter, the second filter, and the heat exchanger, rather than two or three separate housings for these components, yields a highly compact, space-efficient design.

These advantages of the invention can be vital in many applications. For example, in jet engines, engine fuel can be very cold, especially at high altitudes, and water in the engine fuel may freeze, forming ice particles that can disrupt the flow of fuel to the engine. On the other hand, lubricating oil circulating through the engine is usually very warm. By passing the engine fuel, for example, as the first liquid, and lubricating oil, for example, as the second liquid, through a filter assembly embodying the invention, heat may be transferred through the heat exchanger from the lubricating oil to the engine fuel, warming the engine fuel and preventing the formation of ice particles. At the same time, the engine fuel and the lubricating oil may be filtered by the first and second filters, providing a filtered lubricating oil and a filtered engine fuel that are substantially free of contaminants. All of this occurring within a single compact housing in the tight, crowded confines of the jet engine, where little space is available.

DETAILED DESCRIPTION OF EMBODIMENTS

Figure 1:
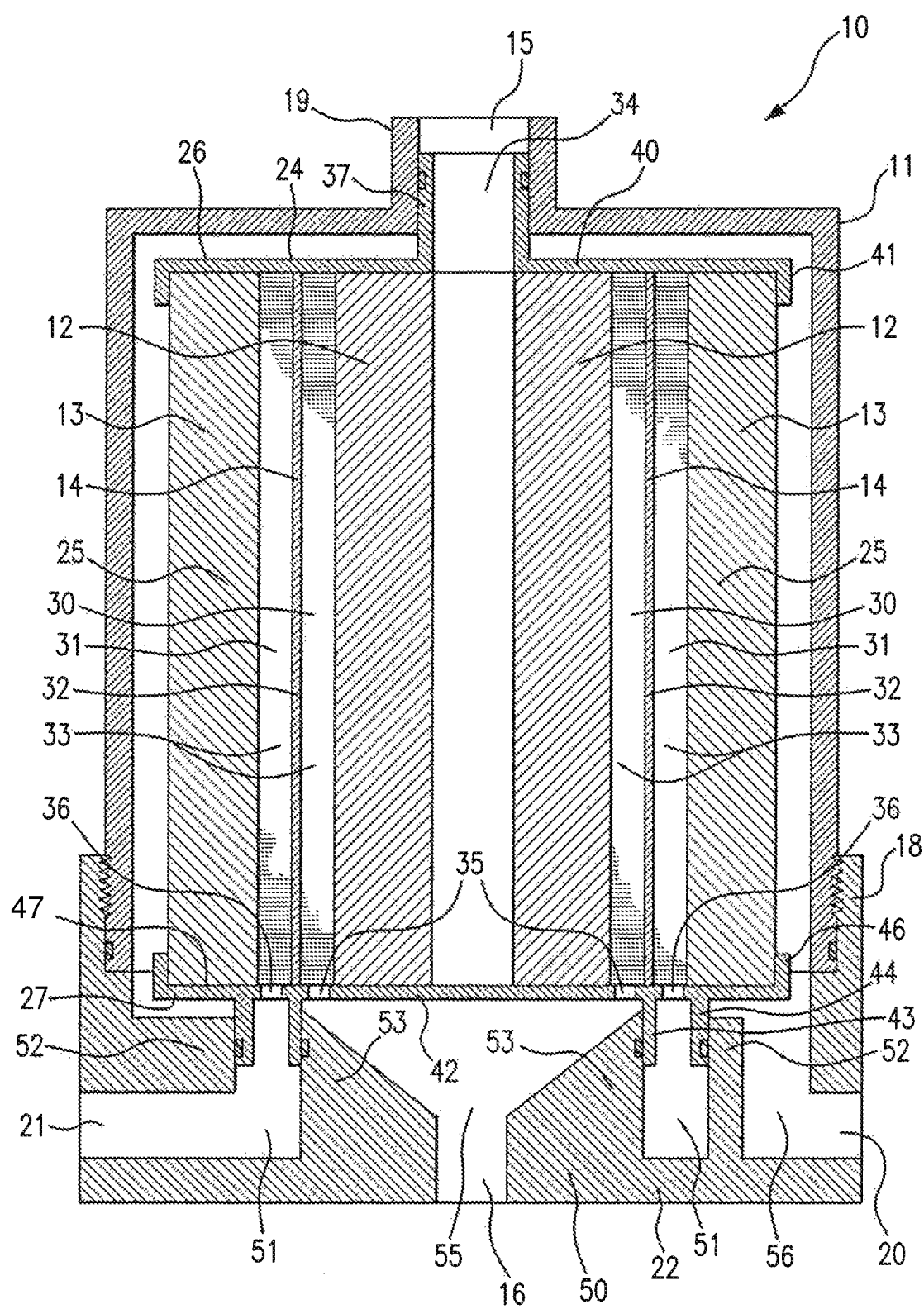
FIG. 1 is a cross sectional view of a filter assembly embodying the invention.

Filter assemblies embodying the invention may be configured in a wide variety of ways. One of many different examples of a filter assembly 10 embodying the invention is shown in FIG. 1. Generally, the filter assembly 10 may comprise a central longitudinal axis A, a housing 11, and a first filter 12, a second filter 13, and a heat exchanger 14 positioned in the housing 11. The housing 11 may include a first inlet 15 and a first outlet 16 and may define a first liquid flow path within the housing 11 which extends through the first filter 12 and along a first side 15 of the heat exchanger 14. The housing 11 may also include a second inlet 20 and a second outlet 21 and may define a second liquid flow path within the housing 11 which extends through the second filter 13 and along a second side 15 of the heat exchanger 14. A first liquid may be directed along the first liquid flow path while a second liquid may be directed along the second liquid flow path, the first and second liquid flow paths being isolated from one another within the housing 11. As the liquids flow through the respective filters, one or more undesirable substances may be removed from each liquid by the filter 11, 12, leaving the liquids substantially contaminant-free, and heat may be transferred through the heat exchanger between the liquids, cooling one liquid and warming the other liquid, all within the single housing 11.

The housing 11 may be configured in any of numerous ways and may have a variety of shapes, both regular and irregular. The housing may be fashioned from any number of impermeable materials, including polymeric materials and metallic materials such as stainless steel, which are capable of withstanding the operating parameters, including the operating temperature and the operating pressure. For some embodiments, the filter assembly may be a disposable filter assembly and the housing may be permanently closed, irremovably containing the first filter, the second filter, and the heat exchanger within the housing. Once a filter becomes sufficiently fouled to require replacement, the entire filter assembly may then be removed and a new filter assembly may be installed.

For many embodiments, the housing may be reusable and may be formed from at least two sections that may be removably attached to one another in any of a variety of ways. For example, the sections may be clamped to one another or threaded to one another to form the housing. The first filter, the second filter, and/or the heat exchanger may be positioned at various locations within the housing, all in one section or one or more of the first filter, the second filter, and the heat exchanger in one section and the remainder in the other section(s). Once a filter becomes sufficiently fouled to require replacement, the sections may be detached from one another, the fouled filter(s) may be removed from the housing, a clean or new filter(s) may be installed in the housing, and the sections may be reattached to one another.

The removably attached sections of the housing may be configured in a variety of ways, including, for example, as a cover removably attached to an end of a vessel or a vessel formed in at least two portions clamped to one another. In the illustrated embodiment, the housing 11 may be configured as a header 22 and a bowl 23 removably attached to the header 22, for example, by a sealed threaded connection. For example, the bowl 23 may have a generally cylindrical configuration including a closed end and a threaded open end. The header 22 may have a threaded collar 18 and the threaded open end of the bowl 23 may be threaded to the collar 18 of the header 22. The first inlet, the first outlet, the second inlet, and the second outlet of the housing may be distributed among the header and the bowl in a variety of ways. For example, in the illustrated embodiment, the first inlet 15 may be in the bowl 23 while the first outlet 16, the second inlet 20, and the second outlet 21 may be in the header 22. In other embodiments, all of the inlets and outlets may be in the header. Alternatively, the bowl may include more than one inlet or outlet. Although the inlets and outlets may be positioned at a variety of locations in the bowl and/or header, in the illustrated embodiment the first inlet 15 may be positioned generally near the center at the closed end of the bowl 23. The closed end of the bowl 23 may include an axially outwardly protruding fitting 19, and the first inlet 15 may extend through the fitting 19. The first outlet 16 may be positioned generally near the center of the bottom of the header 22, and the second inlet 20 and the second outlet 21 may be positioned on opposite sides of the header 22. In other embodiments, the first inlet and the first outlet and/or the second inlet and the second outlet may be differently positioned, for example, may be reversed.

The first filter, the second filter, and the heat exchanger may be variously mounted within the housing. For example, each may be a separately removable and installable component, allowing, for example, each filter to be separately replaced as it becomes fouled. However, for many embodiments, at least the first filter and the second filter or all three of the first filter, the second filter, and the heat exchanger may be an integral part of a single filter element that may be mounted within the housing. As the first filter and/or the second filter become sufficiently fouled to require replacement, the entire filter element, including, for example, the first filter, the second filter, and the heat exchanger, may be removed from the housing and replaced by a new or cleaned filter element.

Figure 2:
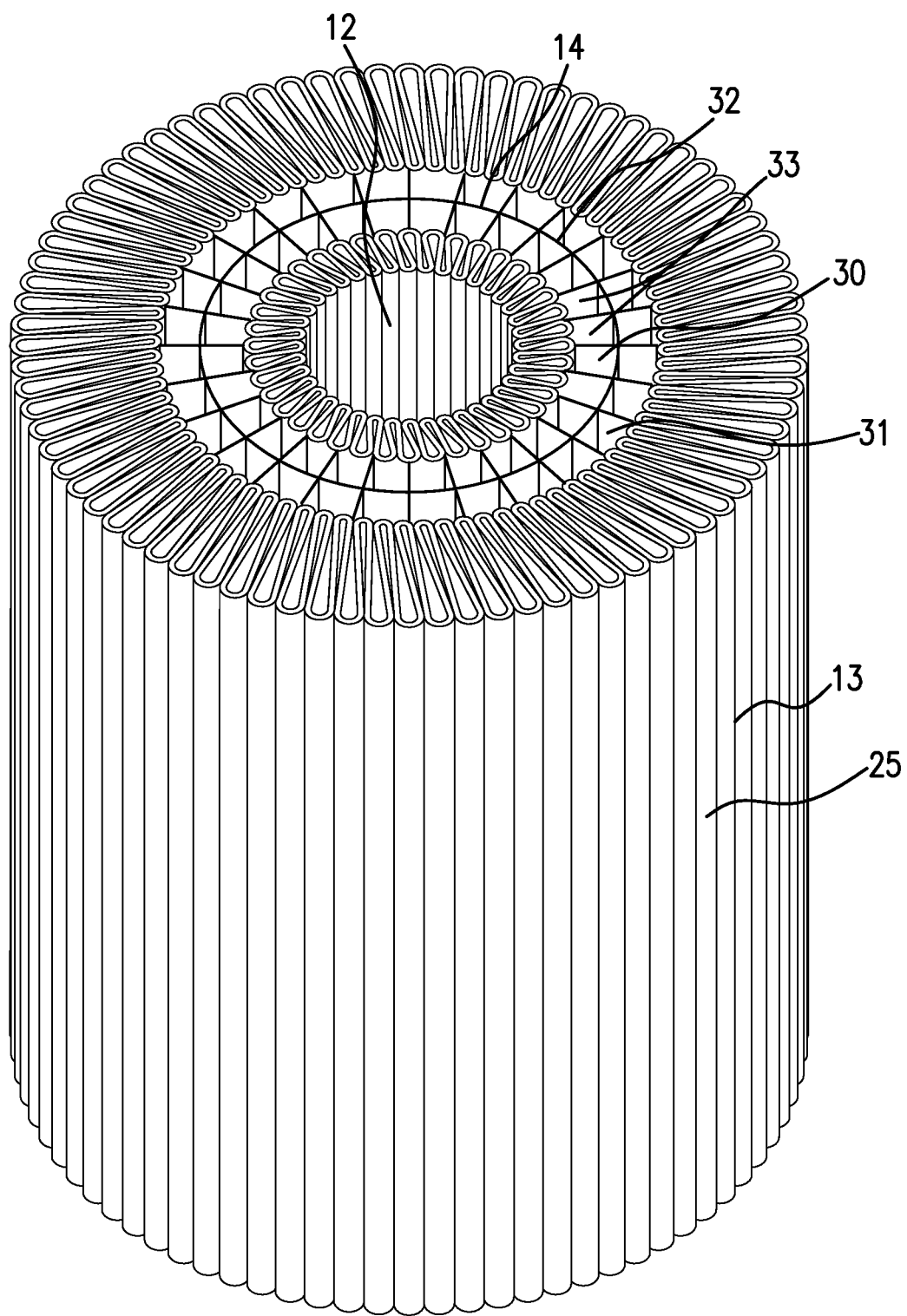
FIG. 2 is a perspective view of a filter structure of the filter assembly of FIG. 1.

Filter elements embodying the invention may be configured in a wide variety of ways. One of many different examples of a filter element 24 embodying the invention is shown in FIG. 1. Generally, the filter element 24 may comprise a filter structure 25 having opposite ends and first and second end caps 26, 27 attached to the ends of the filter structure 25. As shown in FIG. 2, the filter structure 25 may include the first filter 12, for example, as an inner filter; the second filter 13, for example, as an outer filter; and the thermally conductive heat exchanger 14 positioned between the first and second filters 12, 13.

Each filter may be variously configured. For example, both the first and second filters 12, 13 may have a generally cylindrical shape, including first and second axial ends, inner and outer peripheries, and a hollow interior which may span the axial length of each filter 12, 13. Each cylindrical filter may have any of numerous polygonal cross sections, including a circular cross section. The first filter 12 may, for example, be positioned coaxially within the second filter 13 and may have an outer diameter at the outer periphery which is smaller than the inner diameter at the inner periphery of the second filter 13, defining a space, e.g., an annular space, between them.

One or both filters may be pleated or non-pleated. Non-pleated filters maybe variously configured, including, for example, as a hollow cylindrical mass of fibers or a permeable sheet, membrane or strip spirally or helically wound to form a hollow, cylindrical structure. Pleated filters may also be variously configured. For example, both the first and second filters 12, 13 may include a plurality of pleats extending generally axially between the opposite ends of the filters 12, 13. The pleats may include crests near the outer periphery of the filters 12, 13, roots near the inner periphery of the filters 12, 13, and a pair of pleat legs extending between each crest and root. The filters may be variously pleated. For example, one or both filters may have fan-type pleats where the height of each pleat is substantially equal to the radial distance between the crests and the roots. Alternatively, one or both filters may have laid-over type pleats where the height of each pleat is greater than the radial distance between the crests and the roots, U.S. Pat. Nos. 5,543,047 and 5,252,207 are incorporated by reference to provide additional support for laid-over type pleats and fan-type pleats as well as other aspects of the filter element.

Regardless of the type of pleat, the pleat heights of the first and second filters 12, 13 may be approximately equal to one another or may be different form one another, e.g., the height of the pleats of the first filter 12 may be greater or less than the height of the pleats of the second filter 13. For many embodiments, the ratio of the heights of the second filter to the first filter can vary, for example, according to the nature of the liquids being filtered. For example, viscous liquids may be filtered with shorter pleat heights, e.g., in which the ratio of heights of the second filter to the first filter may be in the range from about 1:0.75 to about 1:1.25. However, for less viscous liquids a ratio in the range from about 1:1 to about 2:1 may be useful.

Each filter, whether pleated or non-pleated, includes a filter medium which can remove one or more substances from a liquid flowing through the filter medium. The filter may be formed from a single layer comprising the filter medium or from a composite of two or more layers in which at least one layer comprises the filter medium. For example, a layer of the filter medium may be sandwiched between two drainage layers. The filter medium may be fashioned in a variety of forms from any of numerous materials. For example, the filter medium may be in the form of a permeable woven or nonwoven fibrous sheet, a permeable supported or unsupported membrane, or a permeable fibrous mass and may be fashioned from sintered metal particulates or fibers, glass fibers, or natural or synthetic polymers, including polymeric fibers or permeable polymeric sheets. The filter medium may be permeable, i.e., may be porous, semipermeable, or permselective and may have a constant or graded pore structure. Further, the filter medium may have, or may be modified to have, any of a myriad of filtration characteristics. For example, the filter medium may have any of a wide range of molecular cutoffs or removal ratings, e.g., from ultraporous or nanoporous or finer to microporous or coarser, to remove particulates, such as solids, gels, and colloidal particles, or large molecules from the liquids. Alternatively or additionally, the filter medium may have a positive or negative electrical charge or polarity; may be liquiphobic or liquiphilic, including hydrophobic or hydrophilic or oleophobicor oleophilic; and/or may have one or more attached functional groups, such as ligands or any other reactive moiety, to remove one or more chemical substances from the liquids. For many, but not all, embodiments, the filter media of both filters may have similar filtering characteristics.

Each filter may further include a variety of other components. For example, either or both filters may include an outer retainer around the crests of the pleats. The retainer may be variously structured, for example, as a perforated cage or a permeable or impermeable strip wrapped circumferentially or helically around the outer periphery of the filter, e.g., around the crests of the pleats. The retainer may support the pleats, for example, against forces associated with liquid flow inside-out through the filter and/or may maintain the pleats in position to provide a more even dirt loading of the filter. Further, either or both filters may include a perforated core around the inner periphery of the filter, e.g., around the roots of the pleats. The perforated core may support the pleats, for example, against forces associated with liquid flow outside-in through the filter and/or may also help to maintain the pleats in position.

The heat exchanger may be positioned between the first and second filters, separating the first and second filters from one another. For example, the heat exchanger 14 may be positioned coaxially in the annular space between the first filter 12 and the second filter 13. The heat exchanger 14 may have a first side 30, e.g., an inner side, and a second side 31, e.g., an outer side, and may serve to transfer heat between first and second liquids flowing along the first and second sides 30, 31 of the heat exchanger 14. The heat exchanger 14 may also serve to support the first and second filters 12, 13 against forces associated with liquid flow inside-out through the first filter 12 and/or liquid flow outside-in through the second filter 13. Additionally, the heat exchanger 14 may serve to direct filtered fluid away from, or unfiltered fluid toward, the outer periphery of the first filter 12 and/or the inner periphery of the second filter 13.

Heat exchanger may be variously configured. For example, the heat exchanger may comprise a generally cylindrical body having a first, e.g., an inner, side and a second, e.g., an outer, side. For some embodiments, the cylindrical body may define a series of undulations arrayed circumferentially around the cylindrical body, and the undulations may run straight or helically parallel to one another from one end of the cylindrical body to the other, defining flow channels along the undulations on both sides of the body. The outer periphery of the first filter may contact and may be supported by the inner ridges of the undulations, and the inner periphery of the second filter may contact and may be supported by the outer ridges of the undulations.

Figure 3:
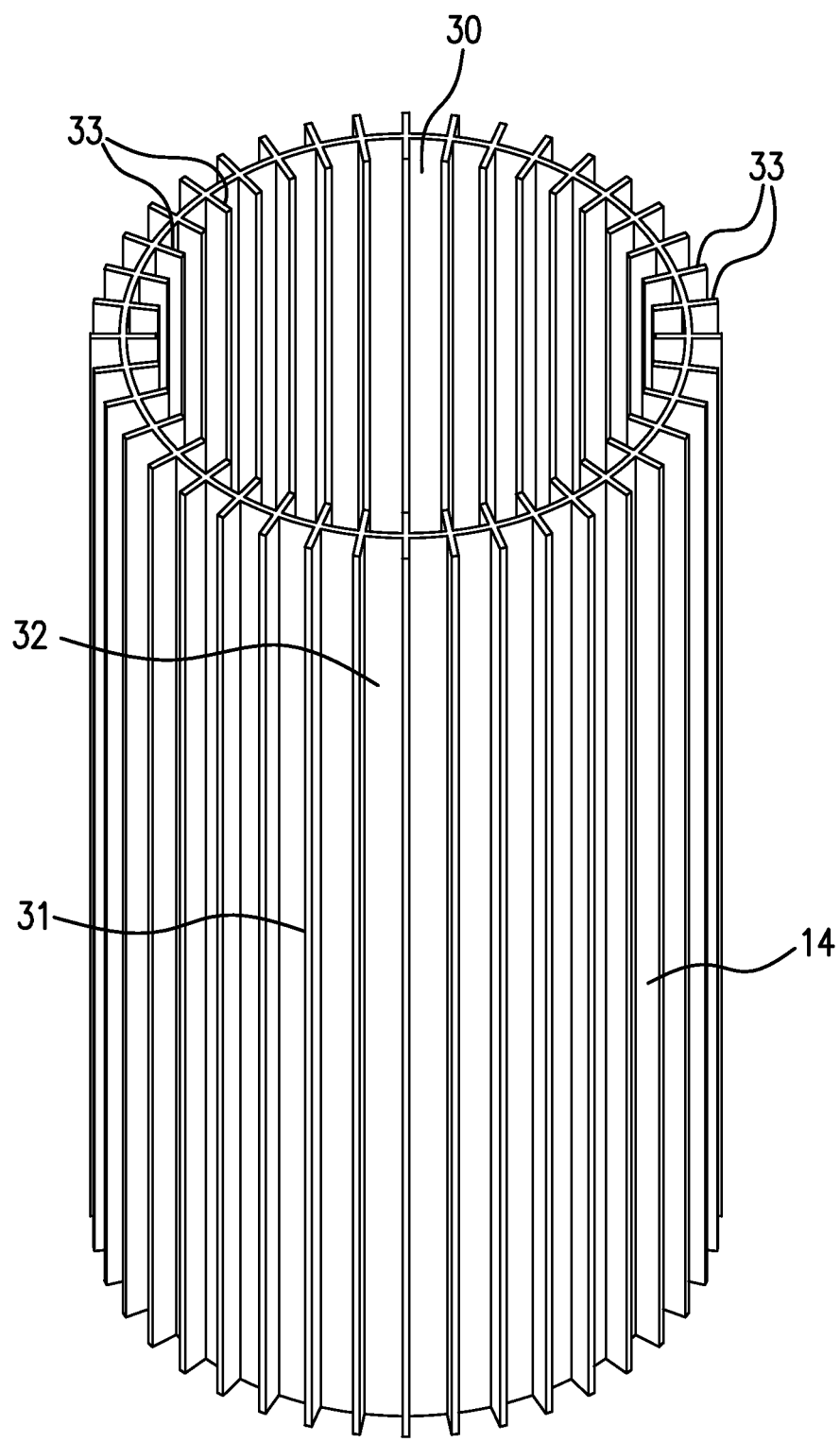
FIG. 3 is a perspective view of a heat exchanger of the filter assembly of FIG. 1.

In other embodiments, the heat exchanger may comprise a cylindrical body having first and second sides, e.g., inner and outer sides, and a plurality of protrusions extending generally radially inwardly and outwardly from the first and second sides of the cylindrical body. The protrusions may be configured in numerous ways. For example, the protrusions may include an array of short straight, angled, or curved ribs, which extend from the cylindrical body generally radially inwardly on the inner side and outwardly on the outer side. Each angled or curved rib may have any of a variety of configurations, e.g., a V-shaped configuration or a quarter- or semi-circular configuration. The outer periphery of the first filter may contact and may be supported by the inner edges of the inner ribs, and the inner periphery of the second filter may contact and may be supported by the outer edges of the outer ribs. Alternatively, as shown in FIGS. 1 and 3, the plurality of protrusions 33 may include an array of continuous or discontinuous elongate ribs which extend generally radially inwardly from the first side 30 of the cylindrical body 32 and generally radially outwardly from the second side 30 of the cylindrical body 32. The elongate ribs 33 on each side 30, 31 may run parallel to one another in the axial direction either straight or helically, defining flow channels between adjacent ribs 33 on both sides of the body 32. The inner edges of the ribs 33 on the first side 30 may contact and support the outer periphery of the first filter 12 and the outer edges of the ribs 33 on the second side 31 may contact and support the inner periphery of the second filter 13. The number of protrusions, the height of the protrusions, and the spacing between the protrusions may be varied, for example, to enhance the transfer of heat through the heat exchanger, to enhance the support of the first and second filters, and/or to reduce the resistance to liquid flow along the sides of the heat exchanger.

Regardless of the configuration, the heat exchanger may be fashioned from a variety of materials, including a metal, e.g., aluminum, or any other material having a thermal conductivity suitable for transferring heat between the first and second sides of the heat exchanger. Further, the heat exchanger may be impermeable and nonperforated, isolating the first liquid flow path and any liquid on the first side of the heat exchanger from the second liquid flow path and any liquid on the second side of the heat exchanger.

The end caps may serve to direct liquid through the filter element, and each end cap may be configured in any of numerous ways. For example, in the embodiment illustrated in FIGS. 1 and 2, each end cap 26, 27 may be a unitary piece attached to an end of the filter structure 25, e.g., to corresponding ends of all three of the first filter 12, the heat exchanger 14, and the second filter 13. Alternatively, one or both end caps may have a multipiece structure.

Collectively, the first and second end caps 26, 27 may include at least first, second, and third openings 34, 35, 36, and the first, second, and third openings 34, 35, 36 may be distributed among the first and second end caps 26, 27 in a variety of ways. For some embodiments, all three openings may be in either end cap. In other embodiments, two of the openings may be in one end cap and one opening may be in the other end cap. In the illustrated embodiment, the first opening 34 may be located in the first end cap 26. The first end cap 26 may include an axially outwardly protruding fitting 37, and the first opening 34 may extend through the fitting 37 from one side to the other side of the first end cap 26. The first opening 34 may fluidly communicate through the fitting 37 of the first end cap 26 with the interior of the first filter 12. An annular region 40 of the first end cap 26 may extend from the fitting 37 to the outer radial edge and may serve as an end piece attached to and sealing the corresponding ends of each of the first filter 12, the heat exchanger 14, and the second filter 13. An axially protruding exterior lip 41 may contact a portion of the outer periphery of the second filter 13 and serve to maintain the relative coaxial positions of the second filter 13, the heat exchanger 14, and the first filter 12.

Figure 4:
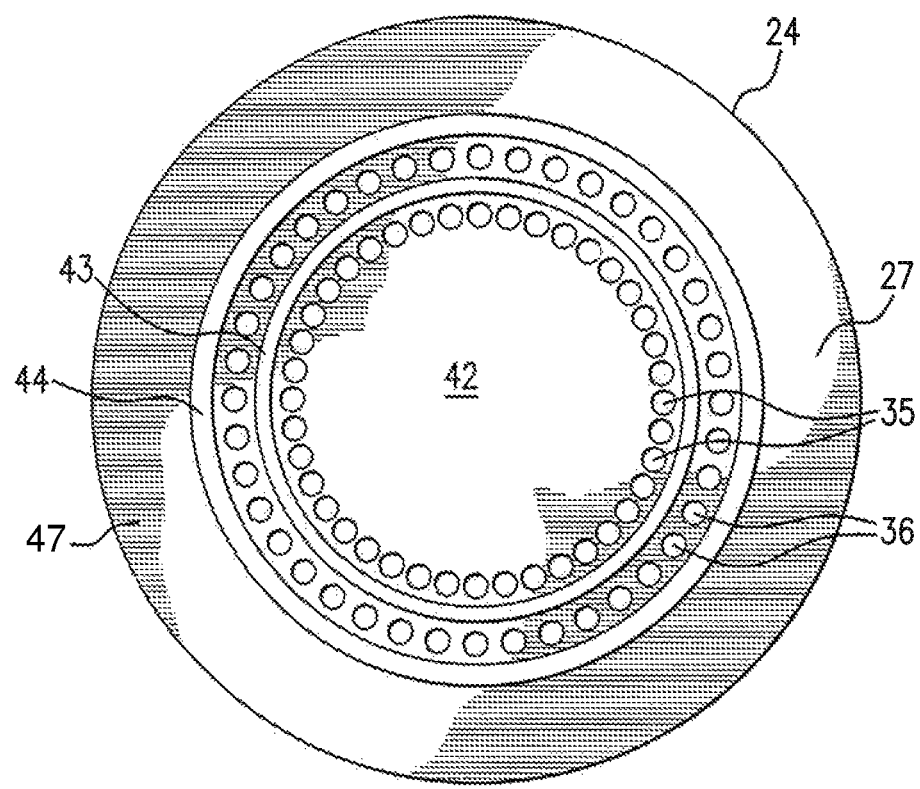
FIG. 4 is an end view of the filter element of FIG. 1 showing the second end cap.

The second end cap 27 may include a central region 42 that may serve as a blind end piece attached to an opposite end of the first filter 12, sealing that end including the interior of the first filter 12. As shown in FIG. 4, the second and third openings 35, 36 may surround the central region 42 of the second end cap 27 and may be radially displaced from one another, for example, the second opening 35 being radially inside the third opening 36 between the third opening 36 and the central region 42. The second and third openings may be variously configured. For example, in the illustrated embodiment, each second and third opening 35, 36 may be generally annular and may comprise a circular array of holes with ribs extending radially between adjacent holes. The second opening 35 may extend through the second end cap 27 and may fluidly communicate with the first side 30 of the heat exchanger 14. Similarly, the third opening 36 may extend through the second end cap 27 and may fluidly communicate with the second side 31 of the heat exchanger 14. A circular sleeve 43 may extend axially from the second end cap 27 away from the heat exchanger 14 and may be connected to the second end cap 27 radially between the second and third openings 35, 36, thereby separating the second and third openings 36, 36. A circular collar 44 may also extend axially from the second end cap 27 away from the heat exchanger 14 but may be connected to the second end cap 27 radially outside of the third opening 36. The circular collar 44 may be coaxial with but radially spaced from the circular sleeve 43. An outer annular region 47 of the second end cap 27 may serve as an end piece attached to and sealing the corresponding end of the second filter 13. An axially protruding exterior lip 46 may contact a portion of the outer periphery of the second filter 13 and serve to maintain the relative coaxial positions of the second filter 13, the heat exchanger 14, and the first filter 12.

The filter element 24 may be assembled in any of numerous ways. For example, the filter structure 24 may be formed by axially moving the heat exchanger 14 along the outer periphery of the first filter 12, or axially inserting the first filter 12 within the interior of the heat exchanger 14. The first filter 12 may then be nested within the heat exchanger 14 with the first side 30 of the heat exchanger 14, e.g., the inner protrusions 33, contacting the outer periphery of the first filter 12. For many embodiments, the first filter 12 may be pleated and may not have an outer retainer. The heat exchanger 14, e.g., the inner protrusions 33, may then contact the crests of the pleats of the first filter 12, supporting the pleats and maintaining the pleats in position without the use of the outer retainer. This reduces the weight of the filter element and lessens the environmental impact of the filter element by reducing the amount of material associated with the filter element.

The second filter 13 may then be axially moved along the outer periphery of the heat exchanger 14, or the nested heat exchanger 14 and first filter 12 may be axially inserted within the interior of the second filter 13. The heat exchanger 14 and the first filter 12 may then be nested within the second filter 13 with the second side 31 of the heat exchanger 14, e.g., the outer protrusions 33, contacting the inner periphery of the second filter 13. For many embodiments, the second filter 13 may be pleated and may not include an inner perforated core. The heat exchanger 14, e.g., the outer protrusions 33, may then contact the roots of the pleats of the second filter 13, supporting the pleats and maintaining the pleats in position without the use of a perforated core. This also reduces the weight of the filter element and lessens the environmental impact of the filter element by reducing the amount of material associated with the filter element.

Alternatively, the filter structure 25 may be formed by first fitting the second filter 13 around the heat exchanger 14 and then fitting the first filter 12 within the heat exchanger 14. For many, but not all, embodiments, the filter structure 25 may be formed with the corresponding ends of the first filter 12, the heat exchanger 14, and the second filter 13 radially aligned with one another to provide axial ends of the filter structure 25 that are generally flat.

The end caps 26, 27 may then be attached and sealed in a variety of ways to the axial ends of the filter structure 25, including the first filter 12, the heat exchanger 14 and the second filter 13. For example, the end caps 26, 27 may be filled with a potting compound such as an epoxy, a polyurethane, or other adhesive, and the axial ends of the filter structure 25 may be set in the potting compound, thereby adhesively bonding the axial ends of the filter structure 25 to the end caps 26, 27. Alternatively, the end caps 26, 27 may be solvent-bonded or heat-bonded to the axial ends of the filter structure 25. For example, where the end caps 26, 27 are fashioned from a polymeric material, the portion of each end cap 26, 27 facing the axial end of the filter structure 25 may be melted, and the axial ends of the filter structure 25 may be set in the molten polymer of the end caps 26, 27, thereby heat-bonding the axial ends of the filter structure 25 to the end caps 26, 27. Once the end caps 26, 27 are attached to the filter structure 25, the filter element 24 is formed and ready to be mounted to the housing 11 of the filter assembly 10.

The filter element may be mounted to the housing in any of numerous ways, depending, for example, on the configuration of the filter element and the housing. For example in the illustrated embodiment, the filter element 24 may be mounted to the housing 11 by first mounting the filter element 24 to the header 22. The header may be variously configured to receive the filter element.

For example, the header 22 may have a base 50 which receives the filter element 24. The base 50 may have a first generally annular channel 51 defined between a circular outer wall 52 and a circular inner wall 53. The filter element 24 may be mounted to the header 22 by inserting the circular sleeve 43 and the circular collar 44 of second end cap 27 into the annular channel 51 of the base 50. The outer wall 52 may include an inner peripheral sealing region that is closely adjacent to the outer periphery of the circular collar 44. A seal, e.g., an O-ring seal, may seal the outer wall 52 of the base 50 of the header 22 to the circular collar 44 of the second end cap 27. The inner wall 53 may include an outer peripheral sealing region that is closely adjacent to the inner periphery of the circular sleeve 43. Again, a seal, e.g., an O-ring seal, may seal the inner wall 53 of the base 50 of the header 22 to the circular sleeve 43 of the second end cap 27. The annular channel 51 may then fluidly communicate between the third opening 36 in the second end cap 27, via the space between the circular sleeve 43 and the circular collar 44, and the second outlet 21 of the housing. The inner wall 53 of the base 50 may also include a central channel 55, e.g., a tapered channel, radially inside the outer peripheral sealing region. With the inner wall 53 of the base 50 sealed to the circular sleeve 43 of the second end cap 27, the central channel 55 may fluidly communicate between the second opening 35 in the second end cap 27 and the first outlet 16 of the housing 11. Further, the outer collar 18 of the header 22 may extend axially from the base 50, for example, surrounding the second end cap 27 and forming an annular space between the outer collar 18 and the outer periphery of the second filter 13. The base 50 may include a third channel 56 that extends between the second inlet 20 of the housing 11 and the annular space between the outer collar 18 and the outer periphery of the second end cap 27. With the outer wall 52 of the base 50 sealed to the circular collar 44 of the second end cap 27, the third channel 56 may fluidly communicate between second inlet 20 of the housing 11 and the outer periphery of the second filter 13.

Once the filter element 24 is mounted to the header 22, the bowl 23 may be mounted to the header 22 around the filter element 24. For example, the bowl 23 may be moved axially along the filter element 24 until the fitting 37 on the first end cap 26 is received within the fitting 19 on the closed end of the bowl 23 and the open end of the bowl 23 contacts the outer collar 18 of the header 22. The open end of the bowl 23 may then be fully threaded onto the outer collar 18 of the header 22, seating the fitting 32 on the first end cap 26 in the fitting 19 on the bowl 23. Seals, e.g., O-ring seals, may seal the fittings 37, 19 to one another and may seal the bowl 23 to the header 22. The filter element 24 is then installed in the housing 11 and the filter assembly 10 is ready for use.

Liquids may be filtered in a number of ways in accordance with methods embodying the invention. For example, methods for filtering first and second liquids may comprise directing a first liquid along a first flow path within a housing and directing a second liquid along a second flow path within the housing. As the first liquid moves along the first flow path, it passes through a first permeable filter medium within the housing to remove one or more substances from the first liquid, and it passes along a first side of a thermally conductive heat exchanger within the housing. As the second liquid moves along the second flow path, it passes through a second permeable filter medium within the housing to remove one or more substances from the second liquid, and it passes along a second side of the heat exchanger. The heat exchanger isolates the first liquid on the first side of the heat exchanger from the second liquid on the second side of the heat exchanger. As the first and second liquids pass along the first and second sides of the heat exchanger, heat may be transferred between the first and second liquids, cooling one liquid and warming the other liquid.

In one of many different examples of a method embodying the invention, a first liquid, for example, a jet engine fuel, may be directed along a first flow path of the filter assembly 10 of FIG. 1. The first liquid may move along the first flow path through the filter assembly 10 and the filter element 24 from the first inlet 15 of the housing 11 through the fitting 19 of the bowl 23 into the first opening 34 in the fitting 37 on the first end cap 26 and hence to the interior of the first filter 12, all generally axially. From the interior of the first filter 12, the first liquid may pass along the first flow path generally radially outwardly through the first filter 12, including the filter medium of the first filter 12, to the first side 30 of the heat exchanger 14. As the first liquid passes through the filter medium of the first filter 12, one or more substances may be removed from the first liquid, leaving the first liquid substantially free of contaminants. The first liquid may then move via the first flow path generally axially along the first side 30 of the heat exchanger 14, e.g., along the protrusions 33 on the first side 30, out of the filter element 24 through the second opening 35 in the second end cap 27, into the central channel 55 in the base 50 of the header 22, and out of the filter assembly 10 via the first outlet 16.

A second liquid, e.g., a jet engine lubricating oil, may be directed along a second flow path of the filter assembly 10. The second liquid may move along the second flow path through the filter assembly 10 and the filter element 24 from the second inlet 20 of the housing 11 through the third channel 56 in the base 50 of the header 22 and into the annular space between the filter element 24 and the housing 11, e.g., between the outer periphery of the second filter 13 and the bowl 23. From the outer periphery of the second filter 13, the second liquid may pass along the second flow path generally radially inwardly through the second filter 13, including the filter medium of the second filter 13, to the second side 31 of the heat exchanger 14. As the second liquid passes through the filter medium of the second filter 13, one or more substances may be removed from the second liquid, leaving the second liquid substantially free of contaminants. The second liquid may then move via the second flow path generally axially along the second side 31 of the heat exchanger 14, e.g., along the protrusions 33 on the second side 31, out of the filter element 24 through the third opening 36 in the second end cap 27, into the annular channel 51 in the base 50 of the header 22, and out of the filter assembly 10 via the second outlet 21.

As the first and second liquids pass through the first and second flow paths along the first and second sides 30, 31 of the heat exchanger 14, heat may be transferred between the first and second liquids. For example, heat may be transferred from the second liquid, e.g., the jet engine lubricating oil, on the second side 31 of the heat exchanger 14 through the heat exchanger 14 to the first side 30 of the heat exchanger 14 and the first liquid, e.g., the jet engine fuel, warming the jet engine fuel and preventing ice particles from forming in the jet engine fuel.

While various aspects of the invention have been described and/or illustrated with respect to several embodiments, the invention is not limited to those embodiments. For instance, one or more features of any embodiment may be eliminated or modified or one or more features of one embodiment may be combined with one or more features of other embodiments without departing from the scope of the invention. Even embodiments with very different features may be within the scope of the invention. For example, one or both of the first and second liquids may be filtered before the first and second liquids are passed along the first and second sides of the heat exchanger. In the illustrated embodiment, the first inlet and the first outlet may be reversed and/or the second inlet and the second outlet may be reversed. Then the first liquid and/or the second liquid may be passed along the first and second sides of the heat exchanger before the first liquid and/or the second liquid is filtered. Further, in the illustrated embodiment, both liquids may flow axially in the same direction along the first and second sides of the heat exchanger. In other embodiments, either the first inlet and the first outlet or the second inlet and the second outlet may be reversed. Then the first and second liquids may flow axially in opposite directions along the first and second sides of the heat exchanger.

Figure 5:
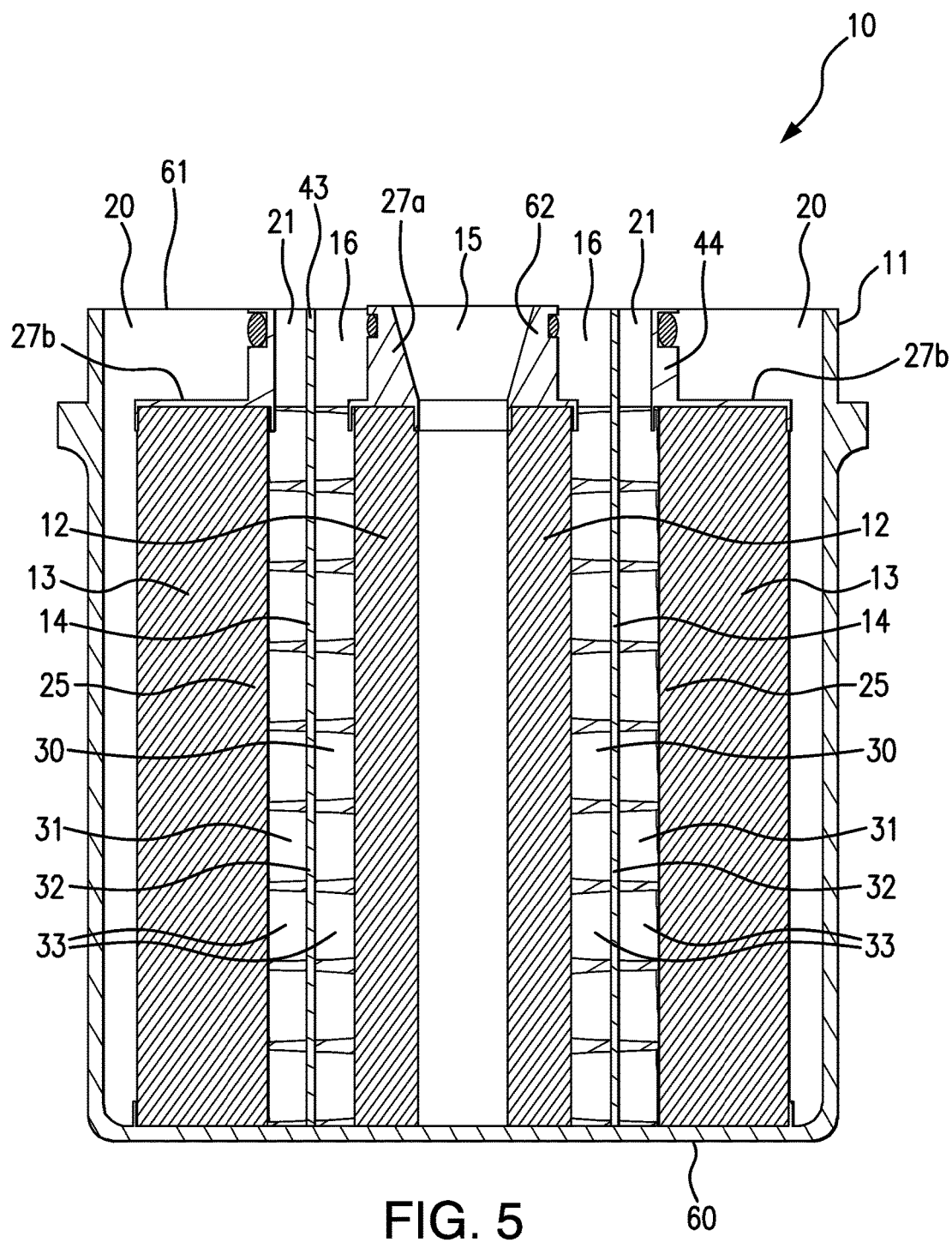
FIG. 5 is a cross sectional view of another filter assembly embodying the invention.
Figure 6:
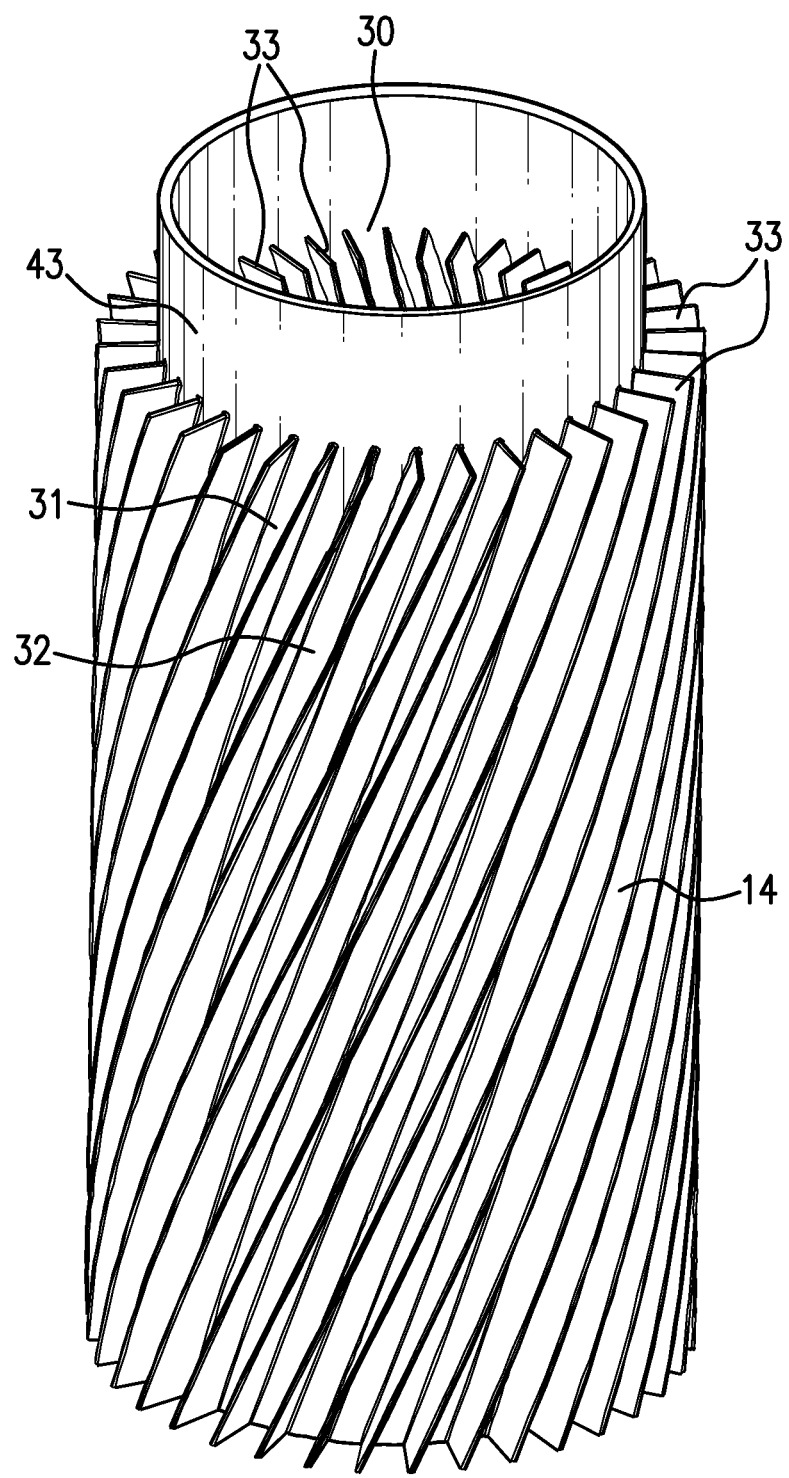
FIG. 6 is a perspective view of a heat exchanger of the filter assembly of FIG. 5.

Another embodiment of a filter assembly 10 is shown in FIG. 5. The filter assembly 10 of FIG. 5 has many features similar to the filter assembly 10 of FIG. 1. For example, the filter assembly 10 of FIG. 5 includes a housing 11 and a filter structure 25 disposed in the housing 11. The filter structure 25 has a first, e.g., inner, filter 12, a second, e.g., outer, filter 13, and a heat exchanger 14 positioned between the first and second filters 12, 13. Much of the previous description of the features of the filter assembly of FIG. 1, including much of the description of the housing, filter structure, first and second filters, and the heat exchanger, apply to the filter assembly of FIG. 5, and analogous features of both filter assemblies are identified by the same reference numerals.

However, the filter assembly 10 of FIG. 5 may be a disposable filter assembly and the first and second filters 12, 13 and the heat exchanger 14 may be permanently mounted in the housing 11. Further, one end of the filter structure 25, including the first and second filters 12, 13 and the heat exchanger 14, may be attached and sealed directly to the closed end 60 of the housing 11 without an end cap being attached to that end of the filter structure 25, the closed end 60 of the housing 11 serving as a blind end piece for that end of the filter structure 25. The filter structure may be attached and sealed to the closed end of the housing in any of a variety of ways. For example, a potting compound may be used to attach and seal the filter structure 25 to the closed end 60 of the housing 11, as previously explained with respect to the filter structure 25 and the first end cap 26 of the filter assembly 10 of FIG. 1. Alternatively, a first end cap may be attached and sealed to the end of the filter structure and the first end cap, in turn, may be attached to the closed end of the housing.

The second end cap of the filter assembly 10 of FIG. 5 may be a multi-piece end cap. For example, the second end cap may include a first open end piece 27a attached to the end of the first filter 12 opposite the closed end 60 of the housing 11 and a second open end piece 27b attached to the end of the second filter 13 opposite the closed end 60 of the housing 11. In the illustrated embodiment, the first and second end pieces 27a, 27b are not connected to one another, although in other embodiments they may be.

The heat exchanger 14 may include protrusions 33, e.g., continuous or discontinuous elongate fins, on both the first and second sides 30, 31, e.g., inner and outer sides, of the cylindrical body 32. However, in the heat exchanger 14 of FIG. 5, the protrusions 33 may run helically from one end to the opposite the end, defining helical flow channels between the protrusions 33 that extend between the ends of the heat exchanger 14. At one end the heat exchanger 14, including the protrusions 33 and the cylindrical body 32 may be attached and sealed to the closed end 60 of the housing 11, blocking off the helical flow channels at that end. At the other end of the heat exchanger 14, the cylindrical body 32 may extend beyond the protrusions 33, forming a circular sleeve 43 that separates the flow channels on one side of the heat exchanger 14 from the flow channels on other side of the heat exchanger 14 at that end.

The housing 11 may include all four openings, e.g., the first inlet 15, the first outlet 16, the second inlet 20, and the second outlet 21, at one end, e.g., an open-end 61 of the housing 11, and the second end cap may include three of these openings. For example, the first open end piece 27a of the second end cap may include an inner circular collar 62 that extends axially away from the first filter 12. The first inlet 15 may comprise an opening in the center of the inner collar 62 that fluidly communicates with the hollow interior of the first filter 12. The first outlet 16 may comprise a generally annular opening between the exterior of the inner collar 62 and the circular sleeve 43 of the heat exchanger 14, the annular opening fluidly communicating with the first side 30 of the heat exchanger 14, e.g., with the fluid channels on the first side 30 of the heat exchanger 14. The second open end piece 27b may include an outer circular collar 44 that extends axially away from the second filter 13. The second outlet 21 may comprise a generally annular opening between the interior of the outer collar 44 and the circular sleeve 43 of the heat exchanger 14, the annular opening fluidly communicating with the second side 31 of the heat exchanger 14, e.g., with the fluid channels on the second side 31 of the heat exchanger 14. The second inlet 20 may comprise an annular opening on the exterior of the outer collar 44 between the outer periphery of the outer end piece 27b and the inner periphery of the housing 11, the annular opening fluidly communicating with the space between the inner periphery of the housing 11 and the outer periphery of the second filter 13. Ribs (not shown) may extend across this annular opening and may be connected between the housing 11 and the outer end piece 27b to maintain the filter structure 25 in position at the open end 62 of the housing 11.

Methods for filtering first and second liquids may include mounting the filter assembly 10 of FIG. 5 to a system manifold, e.g., a manifold on a jet engine (not shown). The filter assembly may be mounted to the manifold in any of a number of ways. For example, the housing of the filter assembly may be clamped to the manifold. Alternatively, the housing at the open end and/or the sleeve of the heat exchanger may be threaded and the filter assembly may be threaded to the manifold. The open end 61 of the housing 11 may be fitted and sealed to the manifold, e.g., via O-rings, with four ports of the manifold fluidly communicating with the first inlet 15, the first outlet 16, the second inlet 20, and the second outlet 21 of the filter assembly 10, respectively.

With the filter assembly mounted to the manifold, a first liquid may be directed from the manifold into the first inlet of the filter assembly and along a first flow path within the housing to the first outlet. For example, a first liquid, e.g., a jet engine fuel, may be directed via the first flow path generally axially along the longitudinal axis of the filter assembly 10 into the first inlet 15 and the interior of the first filter 12. From the interior of the first filter 12, the first liquid may pass along the first flow path generally radially outwardly through the first filter 12, including the filter medium of the first filter 12, to the first side 30 of the heat exchanger 14. As the first liquid passes through the filter medium, one or more substances may be removed from the first liquid, leaving the first liquid substantially free of contaminants. As the first liquid moves through the first filter 12, the helical protrusions on the first side 30 of the heat exchanger 14 support the first filter 12. The first liquid may then move via the first flow path generally axially along the first side 30 of the heat exchanger 14, e.g., along the helical flow channels on the first side 30 of the heat exchanger 14, and out of the filter assembly 10 through the first outlet 16 to the manifold.

In addition, a second liquid may be directed from the manifold into the second inlet of the filter assembly and along a second flow path within the housing to the second outlet. For example, a second liquid, e.g., a jet engine lubricating oil, may be directed via the second flow path generally axially into the second inlet 20 and the space between the inner periphery of the housing 11 and the outer periphery of the second filter 13. From the outer periphery of the second filter 13, the second liquid may pass along the second flow path generally radially through the second filter 13, including the filter medium of the second filter 13, to the second side 31 of the heat exchanger 14. As the second liquid passes through the filter medium, one or more substances may be removed from the second liquid, leaving the second liquid substantially free of contaminants. As the second liquid moves through the second filter 13, the helical protrusions 33 on the second side 31 of the heat exchanger 14 may support the second filter 13. The second liquid may then move via the second flow path generally axially along the second side 31 of the heat exchanger 14, e.g., along the helical flow channels on the second side 31 of the heat exchanger 14, and out of the filter assembly 10 through the second outlet 21 to the manifold.

As the first and second liquids pass through the first and second flow paths along the first and second sides 30, 31 of the heat exchanger 14, heat may be transferred between the first and second liquids. For example, heat may be transferred from the second liquid, e.g., the jet engine lubricating oil, on the second side 31 of the heat exchanger 14 through the heat exchanger 14 to the first side 30 of the heat exchanger 14 and the first liquid, e.g., the jet engine fuel, warming the jet engine fuel and preventing the formation of ice particles in the jet engine fuel.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as," "for example", or "e.g.") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter assembly comprising:
a housing having a first liquid inlet and a first liquid outlet and defining a first liquid flow path within the housing between the first liquid inlet and the first liquid outlet, the housing further having a second liquid inlet and a second liquid outlet and defining a second liquid flow path within the housing between the second liquid inlet and the second liquid outlet, wherein the first and second liquid flow paths are isolated from one another within the housing;
a first filter located within the housing across the first liquid flow path, the first filter having an outer periphery and including a first permeable filter medium arranged to remove one or more substances from a first liquid flowing along the first liquid flow path through the first filter medium;
a second filter located within the housing across the second liquid flow path, the second filter having an inner periphery and including a second permeable filter medium arranged to remove one or more substances from a second liquid flowing along the second liquid flow path through the second filter medium; and
a thermally conductive heat exchanger located within the housing, the heat exchanger comprising an axial direction, a first side and a second side, and a plurality of elongate ribs extending generally radially from both the first side and the second side of the heat exchanger, wherein none of the plurality of elongate ribs contact one another and the plurality of elongate ribs extend generally helically parallel to each other in the axial direction, wherein the elongate ribs on the first side of the heat exchanger contact the outer periphery of the first filter and the elongate ribs on the second side of the heat exchanger contact the inner periphery of the second filter, wherein at least a portion of the first liquid flow path extends along the first side of the heat exchanger and at least a portion of the second liquid flow path extends along the second side of the heat exchanger to transfer heat from one to the other of the first and second liquids.

2. The filter assembly of claim 1 wherein the housing includes a header and a bowl removably mounted to the header.

3. The filter assembly of claim 2 wherein one of the first inlet and the first outlet is located in the bowl and wherein the other of the first inlet and the first outlet, as well as the second inlet and the second outlet, are located in the header.

4. The filter assembly of claim 1 wherein the housing includes first and second removably attached sections, the filter assembly further including a filter element removably sealed within the housing, wherein the filter element includes at least the first filter and the second filter.

5. The filter assembly of claim 4 wherein the filter element further includes the heat exchanger.

6. The filter assembly of claim 1 wherein the first filter, the heat exchanger, and the second filter are generally cylindrical and are coaxially positioned within the housing, the heat exchanger being located between the first and second filters.

7. The filter assembly of claim 6 wherein the first and second filters each include a plurality of pleats.

8. A filter element comprising:
a filter structure including first and second hollow, generally cylindrical filters and first and second opposite ends, wherein each filter has an inner periphery, an outer periphery, a hollow interior, and a permeable filter medium positioned between the inner and outer peripheries and wherein the first filter is positioned within the second filter, the first filter having an outer diameter and the second filter having an inner diameter which is greater than the outer diameter of the first filter, defining an annular space between the first and second filters, the filter structure further including a thermally conductive heat exchanger positioned in the annular space between the first and second filters, the heat exchanger having a first side facing the first filter and a second side facing the second filter, the heat exchanger comprising an axial direction, and a plurality of elongate ribs extending generally helically parallel to each other in the axial direction from both the first side and the second side of the heat exchanger, wherein none of the plurality of elongate ribs contact one another;

first and second end caps bonded to the first and second ends of the filter structure, wherein the first and second end caps each have a first side and a second side, and wherein the first and second end caps collectively include first, second, and third openings, wherein the first opening extends through the first end cap from the first side to the second side and fluidly communicates with the hollow interior of the first filter via a first liquid flow path and wherein the second end cap blocks off the hollow interior of the first filter, wherein the second opening extends through the second end cap from the first side to the second side and fluidly communicates with the first side of the heat exchanger via the first liquid flow path, wherein the third opening extends through the second end cap from the first side to the second side and fluidly communicates with the second side of the heat exchanger via a second liquid flow path; the first liquid flow path extending between the first opening and the second opening through the filter medium of the first filter and helically along the first side of the heat exchanger; and the second liquid flow path extending between the outer periphery of the second filter and the third opening through the filter medium of the second filter and helically along the second side of the heat exchanger.

9. The filter element of claim 8 wherein the first and second sides of the heat exchanger each include a plurality of fluid channels extending along the heat exchanger between the first and second ends of the filter structure, and wherein the fluid channels on the first side of the heat exchanger extend adjacent to the outer periphery of the first filter and the fluid channels on the second side of the heat exchanger extend adjacent to the inner periphery of the second filter.

10. The filter element of claim 8 wherein the heat exchanger has an impermeable, nonperforated generally cylindrical body, wherein the first and second sides of the heat exchanger comprise the inside and the outside of the cylindrical body, the heat exchanger further including a plurality of protrusions extending generally radially and helically from both the inside and outside of the body and wherein the protrusions on the inside of the body contact the outer periphery of the first filter and the protrusions on the outside of the body contact the inner periphery of the second filter.

11. The filter element of claim 8 wherein the first and second filters each include a plurality of pleats.

12. A method for filtering first and second liquids comprising:

directing a first liquid along a first flow path within a housing, including passing the first liquid through a first filter having an outer periphery and including a first permeable filter medium within the housing to remove one or more substances from the first liquid and further including passing the first liquid to a thermally conductive heat exchanger, wherein the heat exchanger comprises an axial direction, a first side and a second side, and a plurality of elongate ribs extending generally radially from both the first side and the second side of the heat exchanger, wherein none of the plurality of elongate ribs contact one another and the plurality of elongate ribs extend generally helically parallel to each other in the axial direction; passing the first liquid along the elongate ribs of the first side of the heat exchange that contact the outer periphery of the first filter within the housing;

directing a second liquid along a second flow path within the housing, including passing the second liquid through a second filter having an inner periphery and including a second permeable filter medium within the housing and removing one or more substances from the second liquid and further including passing the second liquid along the elongate ribs of the second side of the heat exchanger that contact the inner periphery of the second filter within the housing; and transferring heat through the heat exchanger between the first and second liquids.

13. The method of claim 12 wherein one of directing the first liquid along the first flow path and directing the second liquid along the second flow path includes directing engine fuel along the respective flow path and wherein the other of directing the first liquid along the first flow path and the second liquid along the second flow path includes directing engine lubrication oil along the respective flow path.

14. The method of claim 12 wherein passing the first liquid through the first permeable filter medium and passing the first liquid along the first side of the heat exchanger includes passing the first liquid through the first permeable filter medium before passing the first liquid along the first side of the heat exchanger.

15. The method of claim 12 wherein passing the second liquid through the second permeable filter medium and passing the second liquid along the second side of the heat exchanger includes passing the second liquid through the second permeable filter medium before passing the second liquid along the second side of the heat exchanger.

16. The method of claim 12 wherein passing the first liquid through the first permeable filter medium and passing the first liquid along the first side of the heat exchanger includes passing the first liquid generally radially in a first direction through the first permeable filter medium and passing the first liquid generally axially and helically along the first side of the heat exchanger and wherein passing the second liquid through the second permeable medium and passing the second liquid along the second side of the heat exchanger includes passing the second liquid generally radially in a second direction opposite the first directions through the second permeable filter medium and passing the second liquid generally axially along the second side of the heat exchanger.

17. The method of claim 12 wherein passing the first liquid through the first permeable filter medium includes passing the first liquid through a first hollow, generally cylindrical filter that includes the first permeable filter medium, wherein passing the second liquid through the second permeable filter medium includes passing the second liquid through a second hollow, generally cylindrical filter that includes the second permeable filter medium and is positioned coaxially with the first filter, and wherein passing the first liquid along a first side of the heat exchanger and passing the second liquid along the second side of the heat exchanger includes passing the first and second liquids along the inner and outer sides, respectively, of the heat exchanger coaxially positioned between the first and second filters within the housing.

18. The method of claim 12 wherein passing the first liquid along the first side of the heat exchanger includes passing the first liquid along protrusions on the first side of the heat exchanger and wherein passing the second liquid along the second side of the heat exchanger includes passing the second liquid along protrusions on the second side of the heat exchanger.

\* \* \* \* \*